(12) United States Patent
Caveney

(10) Patent No.: US 7,409,749 B2
(45) Date of Patent: Aug. 12, 2008

(54) COATED STAINLESS STEEL CABLE TIE

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 347 days.

(21) Appl. No.: 10/794,613

(22) Filed: Mar. 4, 2004

(65) Prior Publication Data

US 2004/0172790 A1 Sep. 9, 2004

Related U.S. Application Data

(60) Provisional application No. 60/452,387, filed on Mar. 6, 2003.

(51) Int. Cl.
*B65D 63/08* (2006.01)

(52) U.S. Cl. ............................. 24/21; 24/25

(58) Field of Classification Search ............... 24/16 PB, 24/20 R, 17 AP, 16 R, 25, 17 A, 21
See application file for complete search history.

(56) References Cited

U.S. PATENT DOCUMENTS

| 4,399,592 A | 8/1983 | Chopp, Jr. et al. |
| 4,411,049 A | 10/1983 | Cristea |
| 4,730,615 A * | 3/1988 | Sutherland et al. .......... 606/215 |
| 5,103,534 A | 4/1992 | Caveney |
| 5,802,675 A * | 9/1998 | Parsons .................... 24/16 R |
| 6,560,823 B1 * | 5/2003 | Craig, Jr. ...................... 24/19 |
| 6,647,596 B1 * | 11/2003 | Caveney ...................... 24/21 |
| 6,668,427 B2 * | 12/2003 | Bulanda et al. ............... 24/25 |

FOREIGN PATENT DOCUMENTS

| DE | 94 09 806 U | 9/1994 |
| EP | 0 020 943 A | 1/1981 |
| FR | 2 663 360 A | 12/1991 |
| GB | 702313 A | 1/1954 |

OTHER PUBLICATIONS

Davico Industrial Stainless Steel Roller Ball Cable Ties website product information, 7 pages, date unknown.
Cimco website product information, 2 pages, date unknown.

* cited by examiner

*Primary Examiner*—Robert J. Sandy
*Assistant Examiner*—Ruth C Rodriguez
(74) *Attorney, Agent, or Firm*—Robert A. McCann; Zachary J. Smolinski

(57) ABSTRACT

A metal cable tie is provided with a locking head attached to a strap. The strap comprises a coated portion and an uncoated tip for insertion into the locking head. According to one embodiment, the locking head is coated. A strap may be comprised of stainless steel, with coated portions of the strap being coated with nylon.

4 Claims, 2 Drawing Sheets

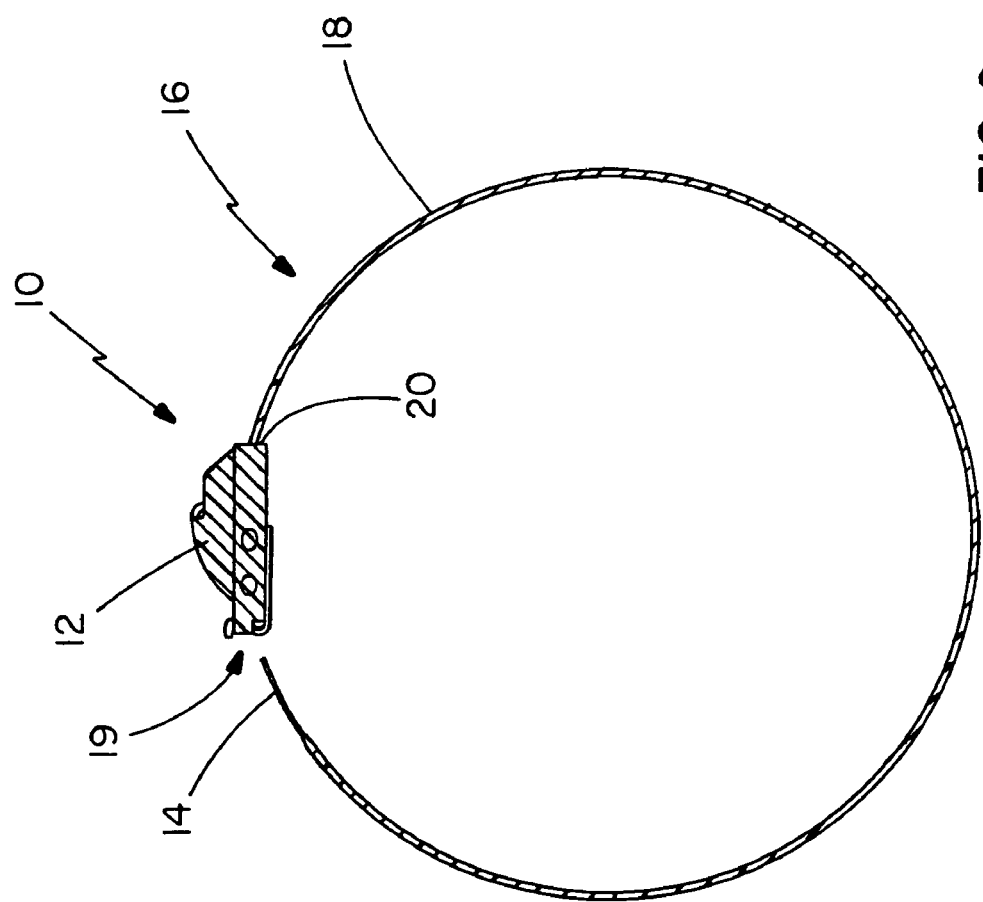
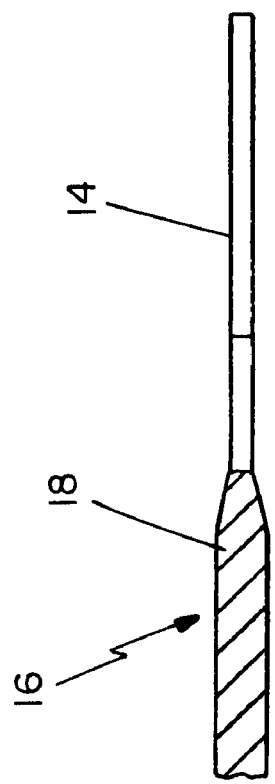

COATED STAINLESS STEEL CABLE TIE

CROSS-REFERENCE TO RELATED APPLICATIONS

This application claims priority to U.S. Provisional Application Ser. No. 60/452,387 filed on Mar. 6, 2003 and entitled, "Coated Stainless Steel Cable Tie," the entirety of which is hereby incorporated by reference.

BACKGROUND OF THE INVENTION

The present invention relates generally to metal cable ties, and more particularly to a coated metal cable tie which utilizes a roller or ball locking mechanism. Prior known metal locking straps have utilized a coating such as nylon over the entire surface of the strap body to provide benefits, including protecting objects from abrasion, making the ties easier to handle in cold temperatures, and preventing galvanic reactions between the steel tie and a different metal. Ball-lock type cable ties have advantages over prior metal cable ties or straps, including being self-locking and infinitely adjustable. Prior attempts at coating the entire strap portion of a ball-lock cable tie of the type disclosed in U.S. Pat. No. 4,399,592 resulted in a degradation of the loop tensile strength of the tie. An improved coated metal ball-lock tie is disclosed in U.S. Pat. No. 5,103,534 which provided for a selectively coated ball-lock type cable tie which left an uncoated longitudinally extending medial portion of the strap aligned with the strap locking means so as to provide an improved overall cable tie. While the '534 teachings allow the locking mechanism for these types of ties to work properly, the objectives are not fulfilled as sufficiently as that of a more fully coated tie.

SUMMARY OF THE INVENTION

According to one embodiment of the present invention, a cable tie is provided with a locking head and a strap having a coated portion and an uncoated tip.

A locking head according to the present invention may be provided with a locking ball for locking the uncoated tip of the strap.

According to some embodiments of the present invention, the coated portion of the strap and the locking head are coated with nylon.

BRIEF DESCRIPTION OF FIGURES

FIG. 3 is a side view of the cable tie of FIG. 1 in a coiled configuration; and FIG. 4 is a side view of a tip of the cable tie of FIG. 1.

DETAILED DESCRIPTION OF PREFERRED EMBODIMENTS

It is known that certain coatings can be used for ball-lock cable ties to more completely coat the strap. However, due to the additional thickness, the strap becomes difficult to insert into the locking head. The present invention is directed to a cable tie that employs the benefits of coating but avoids the problems caused by inserting a coated strap into a locking head.

Figure 1:
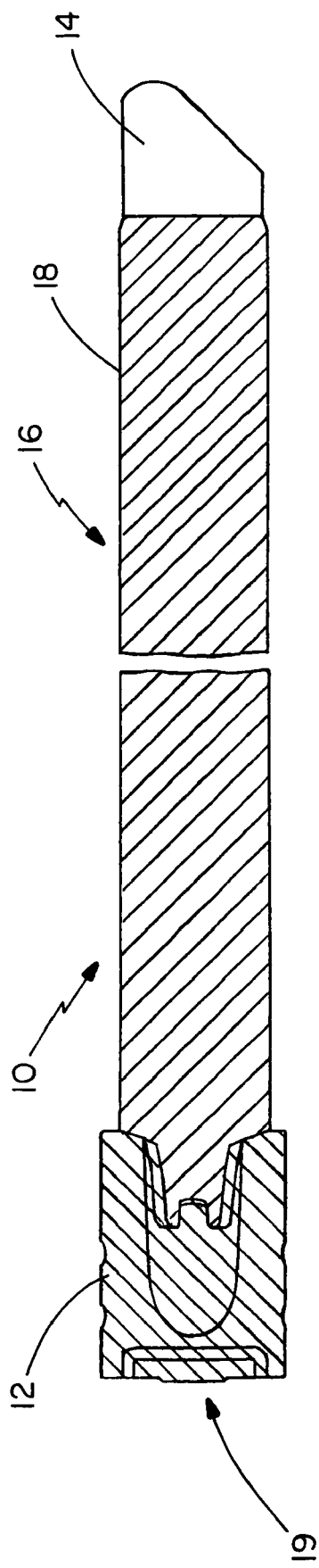
FIG. 1 is a top view of a cable tie according to one embodiment of the present invention.
Figure 2:
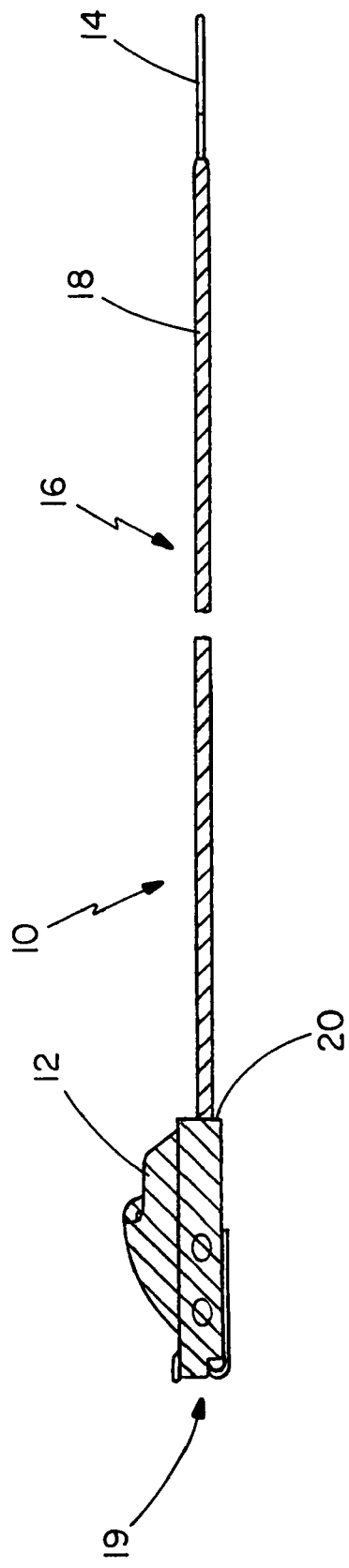
FIG. 2 is a side view of the cable tie of FIG. 1.

Turning now to FIG. 1, a metal cable tie 10 according to one embodiment of the present invention is shown. The metal cable tie 10 comprises a locking head 12 adapted to lock to a tip 14 of a metal strap 16. The metal strap 16 comprises a coated portion 18 and an uncoated tip 14. The uncoated tip 14 provides for easier threading into the locking head 12, which may be coated as shown in FIG. 1. The cable tie 10 of the present invention is formed by assembling a locking head and the strap in the general manner as described in commonly assigned U.S. Pat. Nos. 4,399,592 and 5,103,534, both of which are incorporated herein by reference in their entireties. FIG. 2 shows a side view of the metal cable tie 10, and FIG. 3 shows the metal cable tie 10 in a coiled configuration with the tip 14 positioned for insertion into the locking head 12, which is provided at an end 20 of the strap 16. FIG. 4 is a side view of the uncoated tip 14 and of the end of the coated portion 18 of the strap 16, showing the thickness of the coating and the thickness of the body of the strap 16 without coating. In a preferred embodiment of the present invention, the strap 16 is formed of a metal such as stainless steel.

According to one embodiment of the present invention, the locking head 12 comprises a ball lock. The tolerances of the ball and the locking head are such that minor dimensional changes can have a dramatic effect on the efficiency and consistency of the locking mechanism. Thus, fully coating the metal cable tie 10 may result in difficulties in inserting the tip through the locking head 12. One option for avoiding this interference would be to enlarge the front opening 19 of the locking head 12 (as shown in FIG. 2) so that the coated strap would more readily be inserted. However, the altering of the tolerances or dimensions within the locking head 12 would have a detrimental effect on the locking mechanisms. Thus, it has been found that either the removal of the coating from the tip 14 of the strap 16, or the utilization of a manufacturing process by which the coating is applied to the entire cable tie 10, except for the portion of the tip 14, results in an improved, more fully coated tie 10, which will perform with more consistent locking forces.

The disclosed invention provides a cable tie 10 comprising a coated portion 18 and an uncoated tip 14. It should be noted that the above-described and illustrated embodiments and preferred embodiments of the invention are not an exhaustive listing of the forms such a cable tie in accordance with the invention might take; rather, they serve as exemplary and illustrative embodiments of the invention as presently understood.

The invention claimed is:

1. A cable tie, comprising:
   a strap having an uncoated tip and a coated portion coated with a coating means, said coating means covering the entire surface of the strap except for the uncoated tip; and
   a locking head secured to an end of the strap, said locking head having locking means for accepting said uncoated tip of said strap into said locking head wherein a length of the uncoated tip is at least about one half of a length of the locking head and the uncoated tip provides a reduced thickness allowing easy insertion of the uncoated tip through the locking head.

2. A cable tie, comprising:
   a strap having an uncoated tip and a coated portion coated with a coating means, said coating means covering the entire surface of the strap except for the uncoated tip; and
   a locking head secured to an end of the strap, said locking head having locking means for accepting said uncoated tip of said strap into said locking head wherein a length of the uncoated tip is at least about the same as a length from an end of the locking head to the locking means and the uncoated tip provides a reduced thickness allowing easy insertion of the uncoated tip through the locking head.

3. A cable tie, comprising:

a strap having an uncoated tip and a coated portion coated with a coating means, said coating means covering the entire surface of the strap except for the uncoated tip; and a locking head secured to an end of the strap, said locking head having locking means for accepting said uncoated tip of said strap into said locking head, said uncoated tip having a substantially uniform thickness wherein a length of the uncoated tip is at least about one half of a length of the locking head and the uncoated tip provides a reduced thickness allowing easy insertion of the uncoated tip through the locking head.

4. A cable tie, comprising:

a strap having an uncoated tip and a coated portion coated with a coating means, said coating means covering the entire surface of the strap except for the uncoated tip; and a locking head secured to an end of the strap, said locking head having locking means for accepting said uncoated tip of said strap into said locking head, said uncoated tip having a substantially uniform thickness wherein a length of the uncoated tip is at least about the same as a length from an end of the locking head to the locking means and the uncoated tip provides a reduced thickness allowing easy insertion of the uncoated tip through the locking head.

* * * * *